US008573358B2

(12) United States Patent  
Nonogi et al.

(10) Patent No.: US 8,573,358 B2  
(45) Date of Patent: Nov. 5, 2013

(54) MULTILAYER SOUND ABSORBING STRUCTURE COMPRISING MESH LAYER

(75) Inventors: Mari Nonogi, Sagamihara (JP); Makoto Sasaki, Mishima (JP); Tetsuya Noro, Yokohama (JP)

(73) Assignee: 3M Innovative Properties Company, St. Paul, MN (US)

( * ) Notice: Subject to any disclaimer, the term of this patent is extended or adjusted under 35 U.S.C. 154(b) by 203 days.

(21) Appl. No.: 12/993,539

(22) PCT Filed: May 6, 2009

(86) PCT No.: PCT/US2009/042937
§ 371 (c)(1),
(2), (4) Date: Dec. 16, 2010

(87) PCT Pub. No.: WO2009/142906
PCT Pub. Date: Nov. 26, 2009

(65) Prior Publication Data
US 2011/0100749 A1    May 5, 2011

Related U.S. Application Data

(60) Provisional application No. 61/055,261, filed on May 22, 2008.

(51) Int. Cl.
*E04B 1/82* (2006.01)
*E04B 1/84* (2006.01)
*E04B 1/74* (2006.01)

(52) U.S. Cl.
USPC .......................... 181/291; 181/290; 181/286

(58) Field of Classification Search
USPC .......... 181/291, 290, 294, 286, 289, 210, 292
See application file for complete search history.

(56) References Cited

U.S. PATENT DOCUMENTS

| 1,833,143 | A | * | 11/1931 | Weiss | 181/292 |
|---|---|---|---|---|---|
| 3,166,149 | A | * | 1/1965 | Hulse et al. | 181/292 |
| 3,177,970 | A | | 4/1965 | Boschi | |
| 3,214,565 | A | | 10/1965 | Hager, Jr. et al. | |
| 3,502,171 | A | * | 3/1970 | Cowan | 181/292 |
| 3,630,312 | A | * | 12/1971 | Woodward et al. | 181/292 |
| 3,910,374 | A | * | 10/1975 | Holehouse | 181/292 |
| 3,948,346 | A | * | 4/1976 | Schindler | 181/286 |
| 4,128,683 | A | | 12/1978 | Nomura | |
| 4,249,976 | A | * | 2/1981 | Hudson | 156/286 |
| 4,271,219 | A | * | 6/1981 | Brown | 428/116 |
| 4,294,329 | A | * | 10/1981 | Rose et al. | 181/222 |

(Continued)

FOREIGN PATENT DOCUMENTS

| EP | 0023618 | 2/1981 |
|---|---|---|
| EP | 0816583 | 7/1998 |

(Continued)

OTHER PUBLICATIONS

International Search Report for PCT/US2009/040192, mailed Oct. 22, 2009.

(Continued)

*Primary Examiner* — Edgardo San Martin (57) ABSTRACT

A multilayer sound absorbing structure, comprising a first microperforated film, a mesh layer and a second microperforated film disposed in this order is provided.

22 Claims, 7 Drawing Sheets

(56) References Cited

U.S. PATENT DOCUMENTS

| | | | | |
|---|---|---|---|---|
| 4,410,065 A * | 10/1983 | Harvey | | 181/224 |
| 4,433,021 A * | 2/1984 | Riel | | 428/116 |
| 4,465,725 A * | 8/1984 | Riel | | 428/116 |
| 4,559,255 A | 12/1985 | Shimode et al. | | |
| 4,671,841 A * | 6/1987 | Stephens | | 156/292 |
| 4,743,740 A * | 5/1988 | Adee | | 219/548 |
| 4,828,932 A * | 5/1989 | Morimoto et al. | | 428/608 |
| 5,022,943 A * | 6/1991 | Zaima | | 156/222 |
| 5,041,323 A * | 8/1991 | Rose et al. | | 428/116 |
| 5,175,401 A * | 12/1992 | Arcas et al. | | 181/292 |
| 5,192,624 A * | 3/1993 | Morimoto | | 428/596 |
| 5,364,681 A * | 11/1994 | Pate et al. | | 428/137 |
| 5,545,861 A | 8/1996 | Morimoto | | |
| 5,632,844 A * | 5/1997 | Pate et al. | | 156/290 |
| 5,700,527 A | 12/1997 | Fuchs et al. | | |
| 5,721,402 A * | 2/1998 | Parente | | 181/214 |
| 5,744,763 A | 4/1998 | Iwasa | | |
| 5,888,610 A * | 3/1999 | Fournier et al. | | 428/116 |
| 5,912,442 A | 6/1999 | Nye | | |
| 5,997,985 A * | 12/1999 | Clarke et al. | | 428/116 |
| 6,179,086 B1 * | 1/2001 | Bansemir et al. | | 181/292 |
| 6,267,838 B1 * | 7/2001 | Saugnac et al. | | 156/320 |
| 6,345,688 B1 | 2/2002 | Veen et al. | | |
| 6,360,844 B2 * | 3/2002 | Hogeboom et al. | | 181/213 |
| 6,555,246 B1 | 4/2003 | Zwick | | |
| 6,598,701 B1 | 7/2003 | Wood et al. | | |
| 6,601,673 B2 | 8/2003 | Murakami et al. | | |
| 6,607,625 B2 * | 8/2003 | Andre et al. | | 156/169 |
| 6,615,950 B2 | 9/2003 | Porte | | |
| 6,617,002 B2 | 9/2003 | Wood | | |
| 6,720,069 B1 | 4/2004 | Murakami et al. | | |
| 6,769,512 B2 | 8/2004 | Bargo | | |
| 6,820,720 B1 | 11/2004 | Nicolai et al. | | |
| 6,821,607 B2 | 11/2004 | Zwick | | |
| 6,840,349 B2 * | 1/2005 | Andre et al. | | 181/292 |
| 6,983,822 B2 | 1/2006 | O'Regan et al. | | |
| 6,997,109 B2 | 2/2006 | Saito | | |
| 7,279,214 B2 | 10/2007 | Nicolai et al. | | |
| 7,434,660 B2 * | 10/2008 | Yamagiwa et al. | | 181/293 |
| 7,445,084 B2 * | 11/2008 | Berbner et al. | | 181/290 |
| 7,520,369 B2 * | 4/2009 | Dravet et al. | | 181/292 |
| 7,661,510 B2 * | 2/2010 | Muller | | 181/292 |
| 7,757,809 B2 * | 7/2010 | Pfaffelhuber et al. | | 181/290 |
| 7,770,693 B2 * | 8/2010 | Uejima | | 181/294 |
| 7,921,966 B2 * | 4/2011 | Chiou et al. | | 181/292 |
| 7,946,385 B2 * | 5/2011 | Lalane et al. | | 181/296 |
| 7,963,362 B2 * | 6/2011 | Lidoine | | 181/214 |
| 8,196,704 B2 * | 6/2012 | Chiou et al. | | 181/292 |
| 2005/0006529 A1 * | 1/2005 | Moe et al. | | 244/134 D |
| 2006/0096183 A1 | 5/2006 | Yamaguchi et al. | | |
| 2006/0124387 A1 | 6/2006 | Berbner et al. | | |
| 2006/0289229 A1 | 12/2006 | Yamaguchi | | |
| 2007/0122568 A1 | 5/2007 | Blömeling | | |
| 2007/0227815 A1 | 10/2007 | Nakamura | | |
| 2007/0272482 A1 | 11/2007 | Yamaguchi et al. | | |
| 2008/0118699 A1 * | 5/2008 | Jumel | | 428/114 |
| 2008/0179448 A1 * | 7/2008 | Layland et al. | | 244/1 N |
| 2009/0000865 A1 * | 1/2009 | Zisch et al. | | 181/290 |
| 2009/0166127 A1 * | 7/2009 | Thomas et al. | | 181/292 |
| 2009/0173569 A1 * | 7/2009 | Levit et al. | | 181/286 |
| 2009/0173572 A1 * | 7/2009 | Grenzing et al. | | 181/292 |
| 2009/0250293 A1 * | 10/2009 | Gleine et al. | | 181/292 |
| 2010/0175949 A1 * | 7/2010 | Yamaguchi et al. | | 181/286 |
| 2011/0100748 A1 | 5/2011 | Nonogi et al. | | |
| 2011/0180348 A1 | 7/2011 | Nonogi et al. | | |
| 2012/0155688 A1 * | 6/2012 | Wilson | | 381/354 |
| 2012/0279799 A1 * | 11/2012 | Graf | | 181/290 |

FOREIGN PATENT DOCUMENTS

| | | |
|---|---|---|
| EP | 1775714 | 4/2007 |
| JP | 4037994 | 7/1985 |
| JP | 03-023319 | 1/1991 |
| JP | 3108400 | 5/1991 |
| JP | 04-186397 A | 7/1992 |
| JP | 4186397 | 7/1992 |
| JP | 6-4398 | 2/1994 |
| JP | 06059680 | 3/1994 |
| JP | 60083365 | 3/1994 |
| JP | 7213418 | 8/1995 |
| JP | 08042015 | 2/1996 |
| JP | 8042015 A | 2/1996 |
| JP | 9013943 | 1/1997 |
| JP | 9217955 | 8/1997 |
| JP | 10088689 | 4/1998 |
| JP | 10222170 | 8/1998 |
| JP | 11-062047 A | 3/1999 |
| JP | 2000-020070 A | 1/2000 |
| JP | 2000-144968 | 5/2000 |
| JP | 2001-132132 | 5/2001 |
| JP | 2002-057488 | 2/2002 |
| JP | 2004126487 | 4/2004 |
| JP | 2004-353294 A | 12/2004 |
| JP | 2005-121994 A | 5/2005 |
| JP | 2005-283703 | 10/2005 |
| JP | 2006-153926 A | 6/2006 |
| JP | 2006-323204 | 11/2006 |
| JP | 2007-127908 A | 5/2007 |
| KR | 10-2006-0056384 | 5/2006 |
| WO | WO 2006/021605 | 3/2006 |
| WO | WO 2007/137607 | 12/2007 |

OTHER PUBLICATIONS

International Search Report for PCT/US2009/042937, mailed Dec. 2, 2009.

International Search Report for PCT/US2009/040209, mailed Nov. 24, 2009.

* cited by examiner

- ─+─ Nonwoven Sheet 10mm (500)
- ─■─ PET 12μm-mesh-PET12μm (2mm) (502)
- ─◇─ PET 12μm-mesh-PET12μm (4mm) (504)
- ─*─ PET 12μm-mesh-PET12μm (6mm) (506)
- ─○─ PET 12μm-mesh-PET12μm (8mm) (508)
- ─●─ PET 12μm-mesh-PET12μm (10mm) (510)
- ─◆─ PET 12μm-mesh-PET12μm (15mm) (512)
- ─□─ PET 12μm-mesh-PET12μm (20mm) (514)
- ─▲─ PET 12μm-mesh-PET12μm (30mm) (516)

-△- PE(10μm)-mesh PP277μm x 300μm-PET (38μm) (702)
-□- PE(10μm)-mesh F647μm-PET (38μm) (704)
-◇- PE(10μm)-mesh nylon 990μm-PET (38μm) (706)
-▲- PE(10μm)-mesh PET 4mm-PET (38μm) (708)
-▩- PE(10μm)-mesh PET 12mm-PET (38μm) (710)
-●- PE(10μm)-mesh PET 19mm-PET (38μm) (712)
-+- Nonwoven Sheet 10mm(700)

MULTILAYER SOUND ABSORBING STRUCTURE COMPRISING MESH LAYER

CROSS REFERENCE TO RELATED APPLICATIONS

This application is a national stage filing under 35 U.S.C. 371 of PCT/US2009/042937, filed May 6, 2009, which claims priority to U.S. Provisional Application No. 61/055261, filed May 22, 2008, the disclosures of which are incorporated by reference in their entirety herein.

FIELD OF THE DISCLOSURE

The present disclosure relates to a multilayer sound absorbing structure including a first microperforated film, a second microperforated film, and a mesh layer sandwiched between the first and second microperforated films.

BACKGROUND

Various kinds of sound absorbers are used in a number of different disciplines for absorbing sound. For example, sound absorbers are often used for electric and electronic equipment. With the continuing emphasis on size reduction and cost reduction of such equipment, thin and flexible sound absorbers are desirable. For electric and electronic equipment, an electromagnetic shielding property may also be desirable.

It is thus desirable to provide sound absorbers which are capable of absorbing sounds in a wide range of frequencies, are thin (even including a backing airspace), and may have an electromagnetic shielding property.

SUMMARY

The present disclosure provides a multilayer sound absorbing structure including a first microperforated film, a second microperforated film, and a mesh layer sandwiched between the first and second microperforated films. The multilayer sound absorbing structure may be relatively thin (for example, it may have a total thickness of about 50 microns to 1500 microns or about 80 microns to 1000 microns); and, it can allow the use of a backing airspace that is relatively thin (for example, about 1 mm to about 20 mm or about 1 mm to about 10 mm). The multilayer sound absorbing structure may provide effective sound absorption in various frequencies. Further, in certain embodiments, the multilayer sound absorbing structure of the present disclosure may have an enhanced electromagnetic shielding property. The multilayer sound absorbing structure can be used in relatively limited or narrow spaces as are often found in various kinds of electric and electronic equipment or the like.

Thus, herein is disclosed in one aspect a multilayer sound absorbing structure comprising a first microperforated film comprising through-micro bores, a second microperforated film comprising through-micro bores, and a mesh layer sandwiched between the first and second microperforated films.

Herein is also disclosed a method of absorbing sound comprising the steps of: providing a multilayer sound absorbing structure comprising a first microperforated film comprising through-micro bores, a second microperforated film comprising through-micro bores, and a mesh layer sandwiched between the first and second microperforated films; and, positioning the multilayer sound absorbing structure between an acoustic source and a sound-reflecting surface, with a backing airspace between the multilayer sound absorbing structure and the sound-reflecting surface.

Herein is also disclosed a sound absorber, comprising: a sound-reflecting surface; and, a multilayer sound absorbing structure comprising a first microperforated film comprising through-micro bores, a second microperforated film comprising through-micro bores, and a mesh layer sandwiched between the first and second microperforated films, disposed near the sound-reflecting surface with a backing airspace between the multilayer sound absorbing structure and the sound-reflecting surface The above summary of the present invention is not intended to describe each illustrated embodiment or every implementation of the present invention. The Figures and the detailed description which follow more particularly exemplify these embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
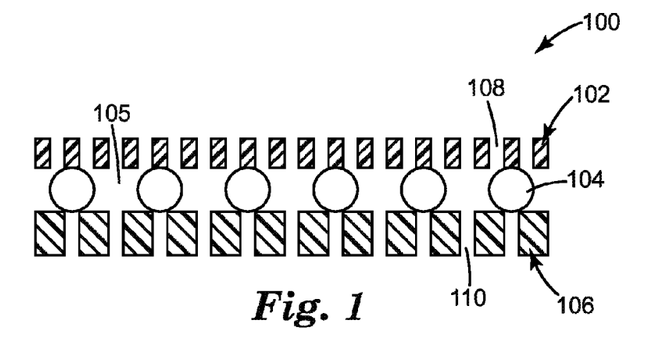
FIG. 1 is a cross-sectional view of one embodiment of the multilayer sound absorbing structure of the present disclosure.

FIG. 1 is a cross-sectional view of one embodiment of the multilayer sound absorbing structure of the present disclosure. In this embodiment, multilayer sound absorbing structure 100 includes a first microperforated film 102, a second microperforated film 106, and a mesh layer 104 sandwiched between first and second microperforated films 102 and 106. First microperforated film 102 includes through-micro bores 108 that are present in a first pattern and pass completely through film 102. Second microperforated film 106 includes through-micro bores 110 that are present in a second pattern and pass completely through film 106. In one embodiment, through-micro bores 108 and 110 have a diameter range of about 10 microns to about 200 microns. In various embodiments, through-micro bores 108 and 110 are present at a density of from about 77,500 bores per square meter to about 6,200,000 bores per square meter; or, about 620,000 bores per square meter to about 3,100,000 bores per square meter. In one embodiment, first microperforated film 102 and second microperforated film 106 each comprise an air permeability of about 0.1 seconds per 100 cc to about 300 seconds per 100 cc (as measured using a GURLEY TYPE DENSOMETER available from Toyo Seiki Seisaku-sho, Ltd, using procedures as outlined in JIS-L-1906). The air permeability value in the Gurley method shows the time it takes 100 cc of air to pass through a film (seconds per 100 cc).

The through-micro bores in each film may be circular or noncircular (e.g., ovals, slits, squares, etc.), and may be regular or irregular. In the case of noncircular or irregularly shaped microbores, the term "diameter" refers to the diameter of a circular opening having the same area as the opening of the non-circular shaped micro-bore. The microbores may also vary in size. In such a case, the diameter refers to the average diameter of the total population of microbores in the film. The diameter and spacing of the through-micro bores in the first microperforated film may be the same as, or may be different from, the diameter and spacing of the through-micro bores in the second microperforated film, as explained in detail later herein.

First microperforated film 102 and/or second microperforated film 106 can comprise, but are not limited to, a resin film having flexibility. Exemplary polymeric materials that can be used include, but are not limited to, polyesters such as polyethylene terephthalate (PET), polybutylene terephthalate (PBT) or polyethylene naphthalate (PEN); polycarbonate; polyolefin such as polyethylene, polypropylene or polybutylene; polyvinyl resins such as polyvinyl chloride, polyvinylidene chloride or polyvinyl acetals; cellulose ester resins such as cellulose triacetate or cellulose acetate. The thickness of first and second microperforated films 102 and 106 can be the same or different, and in one embodiment each is about 10 microns to about 250 microns in thickness. The weight per unit area of the films is not limited, but can be from about 5 grams per square meter to about 500 grams per square meter.

The mesh layer can be comprised of, but is not limited to, a polymeric material or a metal. Exemplary polymeric materials that can be used include, but are not limited to, polyesters such as polyethylene terephthalate (PET), polybutylene terephthalate (PBT) or polyethylene naphthalate (PEN); polyolefin such as polyethylene, polypropylene or polybutylene; nylons such as nylon 6 or nylon 6,6; or fluoropolymer such as ethylene-tetrafluoroethylene (ETFE) or polytetrafluoroethylene (PTFE). Exemplary metals that can be used include, but are not limited to, copper, aluminum, iron, tin, titanium, nickel, lead, zinc, silver, gold, and mixtures, blends, and/or alloys thereof. Specific alloys which may find use include for example brass, bronze, stainless steel, beryllium copper or phosphor bronze.

The thickness of the mesh layer is not limited, but, in one embodiment, may be from about 30 microns to about 1000 microns. The weight per unit area of the films is not limited, but, in one embodiment, can be from about 5 grams per square meter to about 1500 grams per square meter.

As used in the present application, the term "mesh" means a set of members (e.g. fibers, cords, threads, strips, ribbons, struts, etc.), that are in the form of a matrix or network. Such a mesh may be formed, for example, by taking pre-existing fibers and knitting, weaving, lacing, entangling, and/or gluing them together. Or, such a mesh may be formed, for example, by providing a precursor material and molding, polymerizing, crosslinking, etc., so as to form a network (e.g., a reticulated polymer netting) directly (rather than the mesh being assembled from pre-existing individual fibers). In the specific case of metal meshes, the metal mesh can also comprise a so-called expanded metal structure. Regardless of the method of formation, such a mesh layer typically comprises a structure that has two dimensions (e.g., length and width) that are substantially larger than a third dimension (thickness) and has sufficient physical strength and integrity to be handled (rolled up, laminated, etc.) as a free standing web.

In one embodiment, the mesh layer comprises mesh openings 105 that extend completely through the thickness of the mesh layer. Mesh openings 105 may or may not be uniform in size and/or shape, and may or may not be circular. In some cases the mesh openings may be square (e.g., if they are defined by generally perpendicularly-oriented woven threads or members). In some cases the mesh openings may be irregular and/or variable in shape and/or size.

The average diameter of mesh openings 105 includes, but is not limited to, about 0.001 mm to about 30 mm or about 0.02 mm to about 20 mm (with the term diameter referring to that of a circular opening having the equivalent area as that of the actual mesh opening). In some cases, particularly involving generally square or generally rectangular mesh openings, the mesh opening may be characterized by the distance across one or both major (long) axes of the opening (as is done for certain meshes described herein). In such cases an average (equivalent) diameter can still be calculated, of course.

Such a mesh may also be characterized in terms of the (average) cross sectional dimension of the fibers that make up the mesh (e.g., threads in the case of polymeric fibers, woven textiles, and the like; or wires in the case of metal meshes). Such fibers may be relatively uniform in cross section (e.g., circular, square, etc.), in which case a single parameter (e.g., the fiber diameter in the case of a fiber of circular cross section) may be sufficient to characterize the mesh fiber. Or, such fibers may be nonuniform in cross section (for example, oval, elliptical, or rectangular). In such a case such fibers may be characterized by a long cross sectional dimension and a short cross sectional dimension. The average cross sectional dimension of fibers used herein includes, but is not limited to, about 20 microns to about 2 mm.

By the combination of the microperforated films and the mesh layer, excellent sound absorption can be achieved even with a relatively thin construction and/or with the use of a relatively thin backing air space. While not wishing to be limited by theory or mechanism, the multilayer sound absorbing structure of the present disclosure may absorb sound, for example, by membrane oscillation of the films, by friction of air in the through-micro bores, or by a combination of these mechanisms. In addition, an enhanced electromagnetic shielding property can be achieved when the mesh layer includes a metallic material.

The layers of the multilayer sound absorbing structure 100 may be prepared by any known method. For example, a first film can be microperforated by needle punching with a roll having needles to form through-micro bores. If necessary, a nip roll (a back up roll) can be used for such needle punching. For perforation of the through-micro bores, various kinds of needles can be used, and various kinds of shapes of the through-micro bores may be achieved and used, as mentioned previously. A second film can be microperforated by the same manner as mentioned for the first film.

As disclosed herein, the first microperforated film, the mesh layer and the second microperforated film may be disposed in this order (i.e., with the mesh layer sandwiched in between the two microperforated films). In one embodiment, they are positioned such that at least a portion of the mesh layer is in contact with a portion of the first and second microperforated films. In a specific embodiment, they are positioned such that only a portion of the mesh layer is in contact with the first and second microperforated films. Such a configuration can result in additional air gaps being present between the first and second microperforated films at least in certain locations (in addition to the air gap supplied by the presence of the mesh, with its mesh openings, in between the first and second microperforated films). Such additional air gaps may result in a further improvement in sound absorption.

In one embodiment, the first and second microperforated films and the mesh layer are disposed (e.g., attached) together by being laminated by any known lamination method such as dry lamination, adhesion, stapling or stitching. For the dry lamination, heat lamination or lamination without heating (at room temperature) may be used. For the adhesion, gluing with a pressure-sensitive adhesive, a hot melt adhesive, a bond or a bonding tape may be used, for example. In a particular embodiment, spot or point bonding is used, for example by the application of adhesive only in discrete locations. Such point bonding or attachment, as achieved by dry lamination only in selected locations, or by spot gluing, stapling, stitching, etc., may advantageously result in the presence of additional air gaps in between at least a portion of the first and/or second microperforated films and the mesh layer, at least in certain locations. Such additional air gaps may result in a further improvement in sound absorption.

With reference to FIG. 1, in certain embodiments the pattern of the through-micro bores in the first microperforated film may be different from the pattern of the through-micro bores in the second microperforated film. Accordingly, when two such microperforated films are placed adjacent to opposing surfaces of a mesh layer to form the sandwich structure of FIG. 1, the through-micro bores in the first and second microperforated films will not all line up with each other. That is, while some of the through-micro bores in the first microperforated film may be in overlapping relation with through-micro bores in the second microperforated film, at least some of the through-microbores in the first microperforated film will be in overlapping relation with a solid portion of the second microperforated film (that is, a portion not containing a through-micro bore). Also, at least some of the through-microbores in the second microperforated film may be in overlapping relation with a solid portion of the first microperforated film.

This type of arrangement, which is defined herein by the terminology that the through-bores of the first microperforated film and the through-bores of the second microperforated film comprise non-aligned patterns, is distinguished from an arrangement involving aligned patterns. Aligned patterns (described further below) can be achieved, for example, by disposing a first microperforated film and a second microperforated film together (e.g., with a mesh layer therebetween) and then microperforating both films in a single operation (for example, by needle-punching both films), in which case, all of the through-micro bores in the first microperforated film are necessarily aligned with through-micro bores in the second microperforated film.

With such non-aligned patterns, the number of through-micro bores in each microperforated film that are aligned with through-micro bores in the other microperforated film, the location of through-micro bores that are aligned, and the amount of overlap of an individual through-micro bore on one film with a through-micro bore on the other film, will of course depend on the exact microperforation patterns of the two different films, and/or on the placement of the two films relative to each other upon disposing them upon opposite sides of mesh layer 104. In certain embodiments, none of through-micro bores 108 may be aligned with through-micro bores 110.

It is also noted that, in an alternate embodiment, even if the first and second microperforated films comprise identical microperforation patterns, non-aligned patterns can be achieved by disposing the two films upon opposing sides of the mesh layer such that the through-micro bores of the first microperforated film do not line up with those of the second microperforated film.

Figure 2:
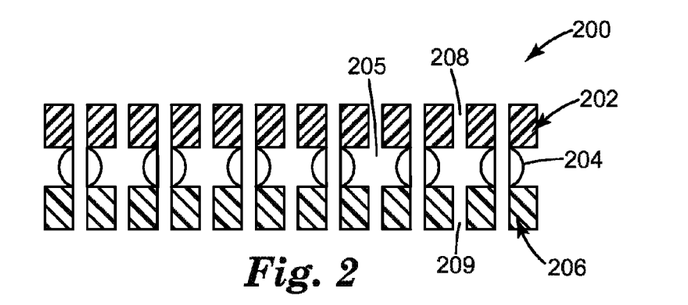
FIG. 2 is a cross-sectional view of another embodiment of the multilayer sound absorbing structure of the present disclosure.

FIG. 2 is a cross-sectional view of another embodiment of the multilayer sound absorbing structure of the present disclosure. In this embodiment, multilayer sound absorbing structure 200 includes a first microperforated film 202 with through-micro bores 208, a mesh layer 204 that comprises mesh openings 205, and a second microperforated film 206 with through-micro bores 209, being disposed in this order. In such an embodiment, through-micro bores 208 and through-micro bores 209 comprise aligned patterns. Such an arrangement may be obtained, for example, by laminating layers 202, 204 and 206 together and then subjecting the layers to a microperforation operation (in such a case, it is necessary that mesh layer 204 permit the performing of such an operation). Such an arrangement can also be obtained by taking pre-microperforated films 202 and 206 and disposing layers 202, 204 and 206 together in registration such that through-micro bores 208 in film 202 are aligned with through-micro bores 209 in film 206 and vice-versa. In a particular embodiment of this approach, the through-micro bores 208 and 209 do not have to be the same size (or shape); they simply need to be positioned such that at least a portion of each bore 208 is at least partially aligned with a corresponding bore 209.

The range of diameter, density and air permeability of through-micro bores 208 and 209 in films 202 and 206, respectively are the same as the through-micro bores 108, 110 mentioned above. Example materials, thickness, and the weight per unit area of first and second microperforated films 202 and 206, and of mesh layer 204, are the same as mentioned above.

Figure 3:
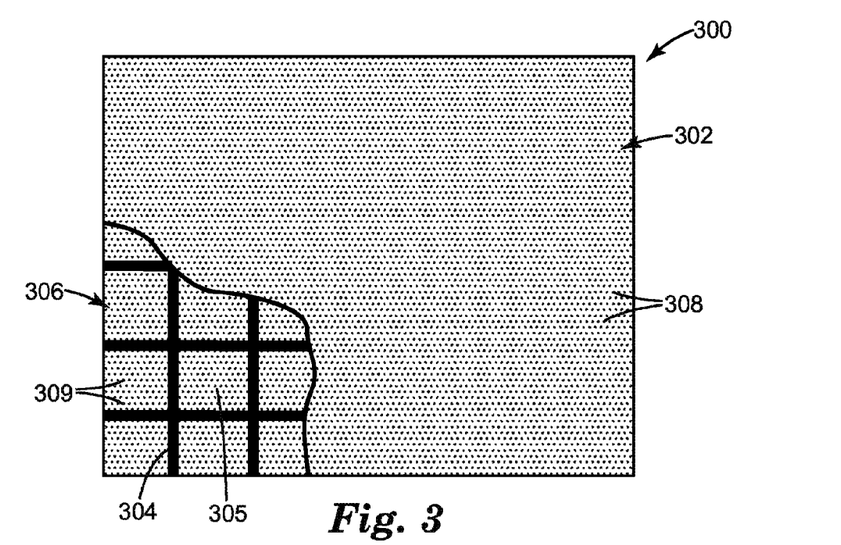
FIG. 3 is a top cutaway view of one embodiment of the multilayer sound absorbing structure of the present disclosure.

FIG. 3 is a top cutaway view of one embodiment of the multilayer sound absorbing structure of the present disclosure, viewed from the side of a first microperforated film 302. Multilayer sound absorbing structure 300 includes first and second microperforated films 302 and 306 having through-micro bores 308 and 309 respectively, and mesh layer 304 between first and second microperforated films 302 and 306. Through-micro bores 308 and 309 can comprise, in alternative embodiments, aligned patterns or non-aligned patterns.

The size, density and air permeability of through-micro bores 308 and 309 are the same as the through-micro bores 108 and 110 mentioned above. Example materials, thickness, and the weight per unit area of the first and second microperforated films and the mesh layer are the same as mentioned above.

Figure 4:
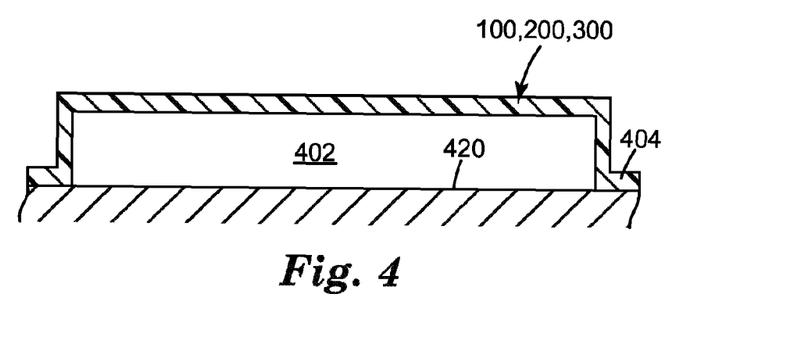
FIG. 4 is a cross-sectional view of another embodiment of the multilayer sound absorbing structure of the present disclosure.

FIG. 4 is a cross-sectional view of another embodiment of the multilayer sound absorbing structure of the present disclosure. To generate a sound absorbing effect multilayer sound absorbing structure 100/200/300 can be placed at or near a sound-reflecting surface 420, as shown in an exemplary manner in FIG. 4. In various embodiments, either the first microperforated film or the second microperforated film can be placed facing the acoustic source (e.g., the incoming airborne sound). Further, multilayer sound absorbing structure 100/200/300 may have a backing air space (gap) 402 between the multilayer sound absorbing structure and sound-reflecting surface 420. The multilayer sound absorbing structure of the present disclosure may exhibit a good sound absorbing effect even if the backing air space is relatively thin (such as, for example, about 1 mm to about 20 mm, about 1 mm to about 10 mm or about 1 mm to about 5 mm). If desired, the multilayer sound absorbing structure may be formed into shapes. For example, the multilayer sound absorbing structure can comprise flanges 404 at one or more edges of the sheet, such that the sheet may be attached to sound-reflective surface 420 by flanges 404, with at least a portion of the multilayer sound absorbing structure being sufficiently far from the sound-reflective surface that an air gap 402 is present between that portion of the multilayer sound absorbing structure and sound-reflective surface 420.

Figure 5:
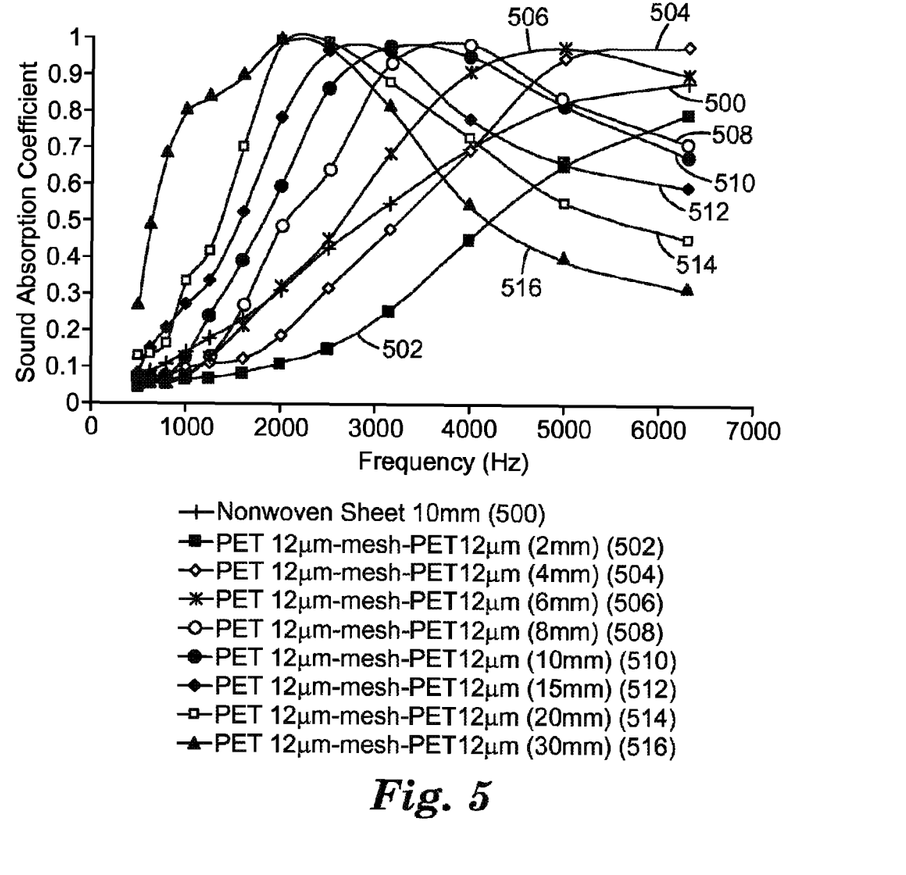
FIG. 5 is a graph of the sound absorption coefficient of multilayer sound absorbing structures with various backing airspace (gap) thicknesses.

FIG. 5 is a graph showing the sound absorption coefficient of multilayer sound absorbing structures with various backing airspace thicknesses, in comparison to a nonwoven sheet. (For comparison, spectrum 500 shows the sound absorption coefficient for a nonwoven sheet of about 10 mm thickness. In this and in other examples, the 10 mm nonwoven sheet comprised a melt-blown polypropylene web of about 200 grams square meter density, with a spun-bonded scrim.) As used herein, the term "backing airspace" means the distance between a sound-reflecting surface which is on the opposite side of the multilayer sound absorbing structure from the acoustic source. The other spectra are for a multilayer sound absorbing structure comprising two 12 micron thick microperforated PET films with through-micro bores of average diameter of about 100 microns in non-aligned patterns, at a density of 1,240,000 bores per square meter, and a 400 micron thick PET mesh layer with about 12 mm mesh opening disposed between the microperforated PET films. The weight of the mesh layer was about 34 grams per square meter and the mesh was comprised of fibers with a short cross sectional dimension of approximately 320 micron and a long cross sectional dimension of about 1.5 mm. Each of these PET films was independently perforated with a roller with needles, then the films were applied to opposite surfaces of the mesh layer, and then laminated with a TRANS JUMBO JP-5040A apparatus (available from JAPAN POLYMARK Co. Ltd.) using a load of about 100 kg for 30 seconds at room temperature. To the both surfaces of the mesh layer was applied spray adhesive before the lamination. Each microperforated PET film comprised a weight of about 17 grams per square meter and an air permeability of about 0.4 seconds per 100 cc. Each multilayer sound absorbing structure was tested for sound absorption at various backing airspace thicknesses, as shown in FIG. 5. All sound-absorption spectra (in this and all other examples) were generated in accordance with ASTM E 1050, using well-known impedance tube testing. For film samples and multilayer sound absorbing structure samples, the sample was positioned in the impedance tube by spanning a 29 mm diameter section of the film or multilayer sound absorbing structure across opening of the impedance tube, with the edges of the sample adhered to the flange of the impedance tube opening using double-sided adhesive, so that the multilayer sound absorbing structure was disposed normal to the incident sound (in these experiments, the multilayer sound absorbing structure was positioned so that the acoustic source faced one of the microperforated films). The reflective surface of the impedance tube (behind the sample from the acoustic source) was adjusted to provide a backing airgap of thickness (depth) shown in the various spectra of FIG. 5. For the nonwoven samples, the nonwoven was placed directly against the reflective surface of the impedance tube with no air gap.

Figure 6:
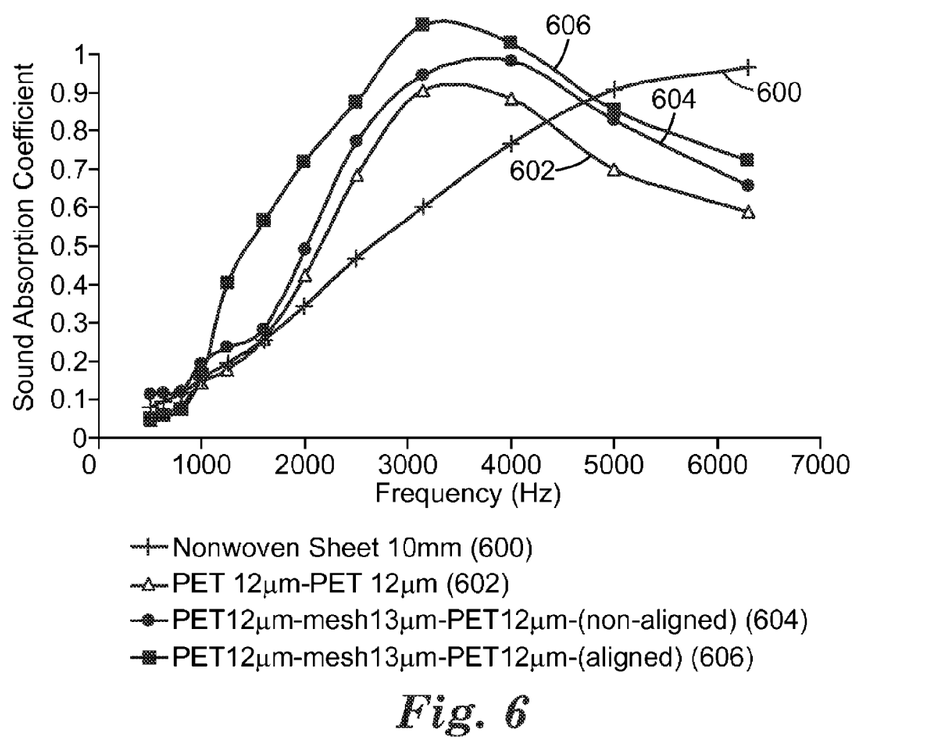
FIG. 6 is a graph of the sound absorption coefficient of a combination of two microperforated film layers, and of a multilayer sound absorbing structure.

FIG. 6 is a graph of the sound absorption coefficient of a film/film laminate and of a multilayer sound absorbing structure. Spectrum 600 depicts the sound absorption coefficient of a non-woven sheet having a thickness of about 10 mm, without a backing airspace. Spectrum 602 depicts the sound absorption coefficient of a film laminate comprising two 12 micron thick microperforated PET films. These PET films were the same as those used in FIG. 5 and were laminated together with a TRANS JUMBO JP-5040A apparatus (available from JAPAN POLYMARK Co. Ltd.) using a load of about 100 kg for 30 seconds at room temperature after perforation with needles. To these PET films was applied spray adhesive before the lamination. Spectrum 604 depicts the sound absorption coefficient of a multilayer sound absorbing structure including the above-described microperforated PET films and a mesh layer laminated between the films. The mesh layer was the same as that of spectrum 502. The multilayer sound absorbing mesh layer was prepared by the same manner as above and the through-micro bores in the first and second microperforated films were in non-aligned patterns. Spectrum 606 depicts the sound absorption coefficient of a multilayer sound absorbing structure including the above-described microperforated PET films and a mesh layer laminated between the films. The mesh layer was the same as used for spectrum 604. The multilayer sound absorbing structure for 606 was prepared in similar manner to the procedures described with reference to FIG. 2 and the through-micro bores in the first and second microperforated films were in aligned patterns. The backing airspace for the sound absorber for spectra 602, 604 and 606 was 10 mm. All the spectra in FIG. 6 were generated in similar manner to those described with reference to FIG. 5.

Figure 7:
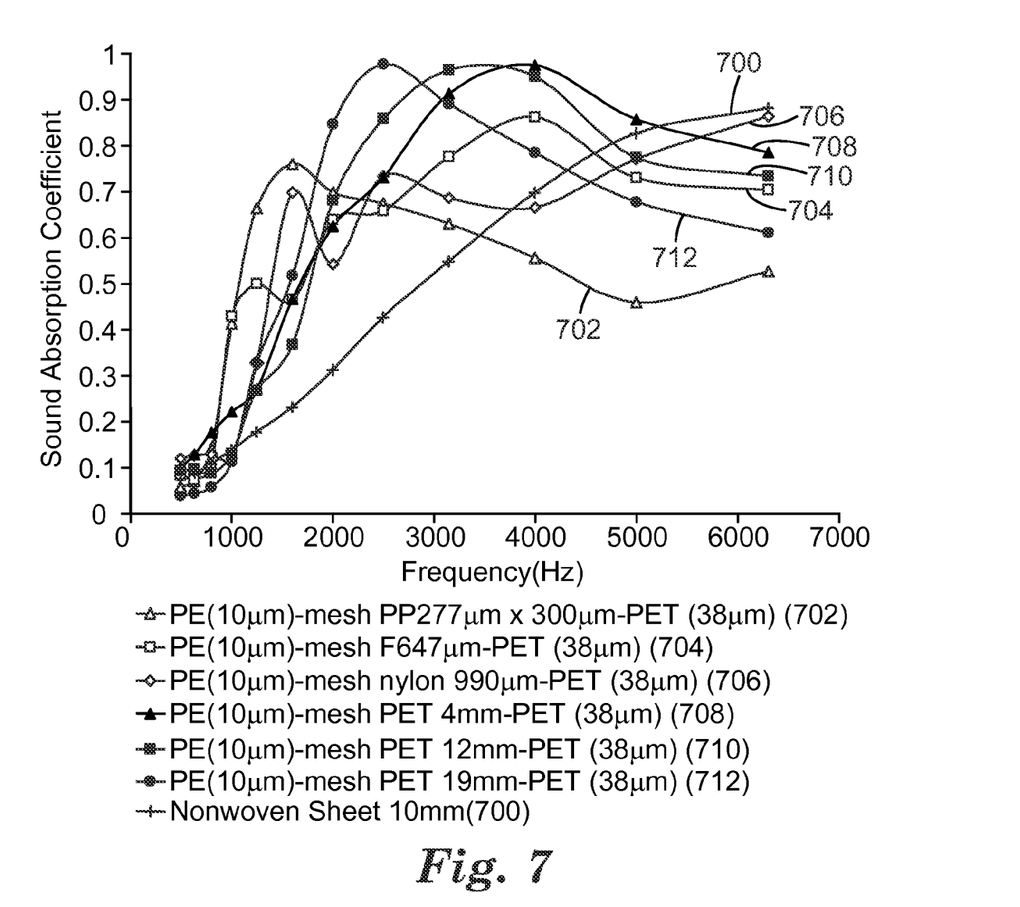
FIG. 7 is a graph of the sound absorption coefficient of multilayer sound absorbing structures with mesh layers having various mesh sizes.

FIG. 7 is a graph showing the sound absorption coefficient of multilayer sound absorbing structures comprising mesh layers of various mesh sizes, in comparison to a nonwoven sheet. Spectrum 700 depicts the sound absorption coefficient of a non-woven sheet having a thickness of about 10 mm, without a backing airspace. Samples for spectra 702, 704, 706, 708, 710 and 712 included the same 10 micron thick microperforated PE film of spectrum 606, and the same 38 micron thick PET film same as used for spectrum 606. The mesh layer for spectrum 702 included a 290 micron thick polypropylene (PP) mesh having an average mesh opening of about 277 microns by about 300 microns and a cross sectional dimension of about 153 microns (Industrial mesh cloth PP #70 available from NBC Inc., Tokyo, Japan). The mesh layer for spectrum 704 included a 390 micron thick ethylene-tetrafluoroethylene (ETFE) mesh having an average mesh opening of about 647 microns and a cross sectional dimension of about 200 microns (Industrial mesh cloth AF30 available from NBC). The mesh layer for spectrum 706 included a 520 micron thick nylon mesh having an average mesh opening of about 990 microns and a cross sectional dimension of about 280 microns (Industrial mesh cloth NB20 available from NBC). The mesh layer for spectra 708, 710 and 712 comprised a PET mesh. The mesh for 708 comprised about a 4 mm mesh opening, about 59 grams per square meter, and about 260 micron thickness. This mesh was comprised of fibers with a short cross sectional dimension of about 160 microns and a long cross sectional dimension of about 1 mm. The mesh for 710 is the same one for spectrum 502. The mesh for 712 comprised about a 19 mm mesh opening, about 7 grams per square meter, and about 200 micron thickness. This mesh was comprised of fibers with a short cross sectional dimension of about 160 microns and a long cross sectional dimension of about 0.6 mm The multilayer sound absorbing mesh layer for 702,704 and 706 were prepared by the similar manner to those described with reference to FIG. 5 except that no adhesive was applied to the mesh surface and the lamination was conducted at about 70 degrees C. The multilayer sound absorbing mesh layer for 708,710 and 712 were prepared by the similar manner to those described with reference to FIG. 5 except that no adhesive was applied to the mesh surface. The backing airspace was 10 mm. All the spectra in FIG. 7 were generated in similar manner to those described with reference to FIG. 5.

Figure 8A:
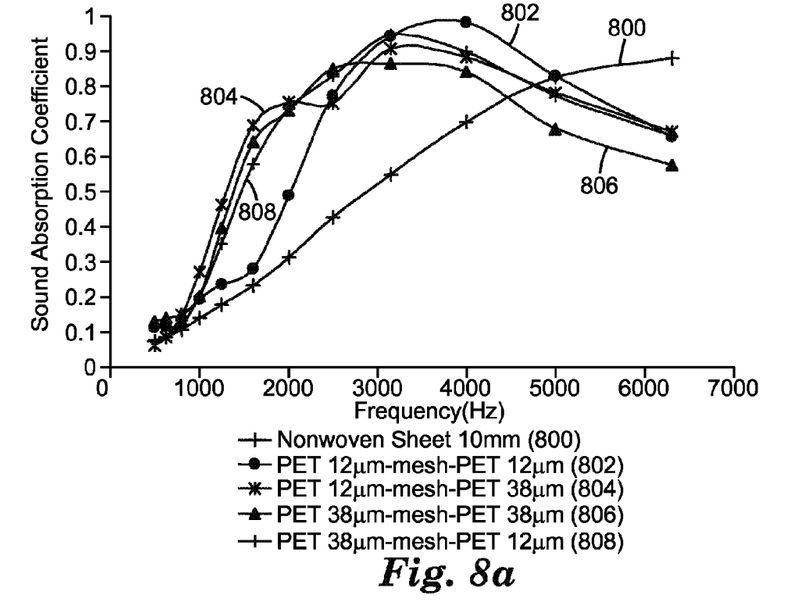
FIGS. 8a and 8b are graphs of the sound absorption coefficient of multilayer sound absorbing structures with various kinds of materials of the first and second microperforated film layers.
Figure 8B:
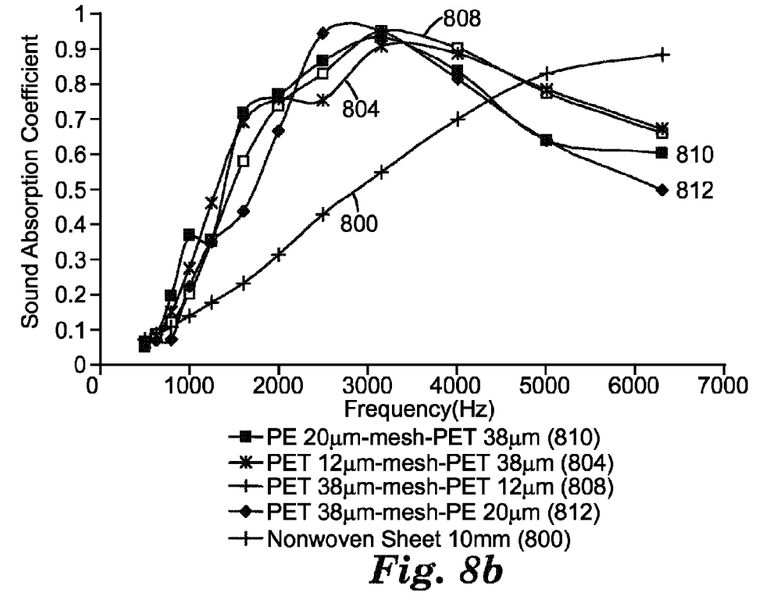

FIGS. 8a and 8b are graphs showing the sound absorption coefficient of multilayer sound absorbing structures comprising films of various thicknesses or materials in comparison to a nonwoven sheet. Spectrum 800 depicts the sound absorption coefficient of a nonwoven sheet having a thickness of about 10 mm, without a backing airspace. The sample used for spectrum 802 was the same as used in spectrum 502. The sample used for spectrum 804 included the 12 micron thick PET film as used for spectrum 802, the mesh layer as used for spectrum 802 and the 38 micron thick PET film as used for spectrum 606. The 12 micron thick PET film faced the acoustic source. The sample used for spectrum 806 included the 38 micron thick PET film as used for spectrum 804, the mesh layer as used for spectrum 804 and the 38 micron thick PET film as used for spectrum 804. The sample used for spectrum 808 included the 38 micron thick PET film as used for spectrum 804, the mesh layer as used for spectrum 804 and the 12 micron thick PET film as used for spectrum 804. The 38 micron thick PET film faced the acoustic source. The sample used for spectrum 810 included a 20 micron thickness polyethylene (PE) film, the mesh layer as used for spectrum 804 and the 38 micron thick PET film as used for spectrum 804. The 20 micron thick PE film included about 1,240,000 bores per square meter, with the bores having an average diameter of about 100 microns. The air permeability of the PE film was about 0.8 seconds per 100 cc. The weight of the 20 micron thick PE film and the 12 micron thick PET film was almost the same and about 17 grams per square meter. The 20 micron thick PE film faced the acoustic source. The sample used for spectrum 812 was the same as used for 810, except that the 38 micron thick PET film faced the acoustic source. Each of the multilayer sound absorbing structures was prepared by the same manner to those described with reference to FIG. 5. The backing airspace was 10 mm. All the spectra in FIG. 8 were generated in similar manner to those described with reference to FIG. 5.

Figure 9:
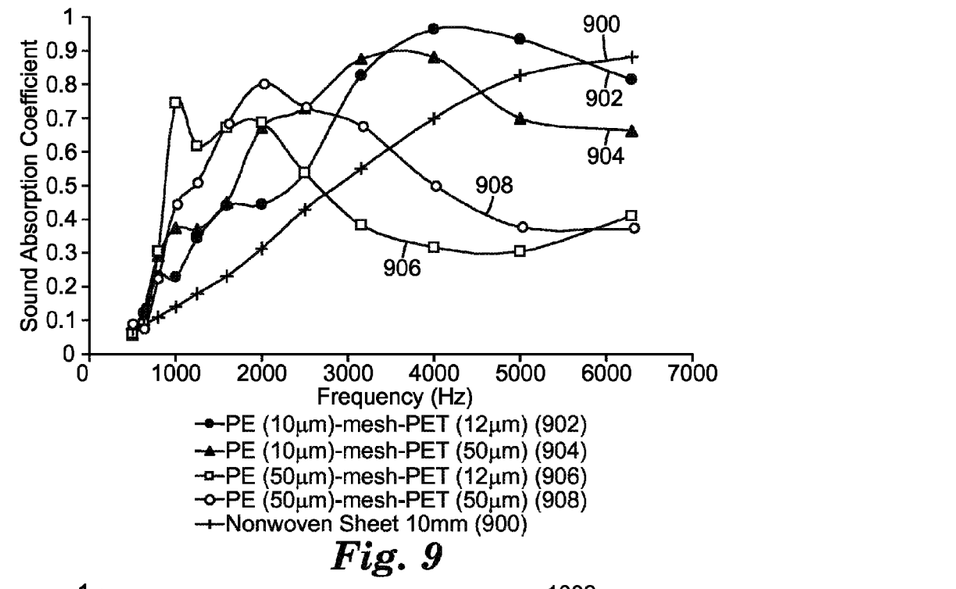
FIG. 9 is a graph of the sound absorption coefficient of multilayer sound absorbing structures with various thicknesses of the first and the second microperforated film layers.

FIG. 9 is a graph of the sound absorption coefficient of multilayer sound absorbing structures with various thicknesses of the first and the second microperforated film layers, in comparison to a nonwoven sheet. Spectrum 900 depicts the sound absorption coefficient of a nonwoven sheet having a thickness of about 10 mm, without a backing airspace. The sample for spectrum 902 included the 10 micron thick PE film as used for spectrum 702, the nylon mesh as used for spectrum 706 and the 12 micron thick PET film as used for 502. The sample for spectrum 904 included the PE film as used for spectrum 902, the mesh as used for spectrum 902 and a 50 micron thick PET film that included through-micro bores of average diameter of about 100 microns, at a density of 1,240,000 bores per square meter. The air permeability and the weight of the PET film were about 1.6 seconds per 100 cc and about 70 grams per square meter, respectively. The sample for spectrum 906 included a 50 micron thick PE film, the same mesh as 902 and the same PET film as 902. The 50 micron thick PE film included through-micro bores of average diameter of about 100 microns, at a density of 1,240,000 bores per square meter. The air permeability and the weight of the PE film were about 4.5 seconds per 100 cc and about 44 grams per square meter, respectively. Sample for spectrum 908 include the same PE film as 906, the same mash as 902 and the same PET film as 904. The acoustic source was faced to the PE film. Each of the multilayer sound absorbing structures was prepared by the same manner to those for the samples of spectra 708, 710 and 712. The backing airspace was 10 mm. All the spectra in FIG. 9 were generated in similar manner to those described with reference to FIG. 5.

Figure 10:
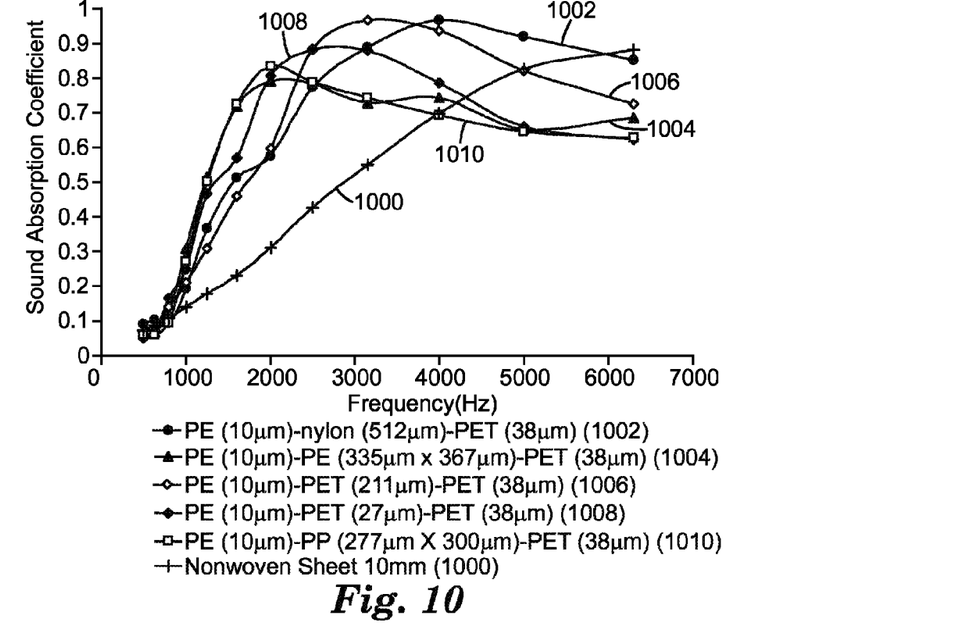
FIG. 10 is a graph of the sound absorption coefficient of multilayer sound absorbing structures with various materials of mesh layers.

FIG. 10 is a graph showing the sound absorption coefficient of films and of multilayer sound absorbing structures with various combinations, in comparison to a nonwoven sheet. Spectrum 1000 depicts the sound absorption coefficient of a nonwoven sheet having a thickness of about 10 mm, without a backing airspace. Samples for spectra 1002, 1004, 1006, 1008 and 1010 included the 10 micron thick PE film as used for spectrum 702, a mesh layer and the 38 micron thick PET film as used for spectrum 702. The mesh layer for spectrum 1002 included a 440 micron thick nylon mesh having a mesh opening of 512 microns and a cross sectional dimension of about 235 microns (Industrial mesh cloth NB34 available from NBC). The mesh layer for spectrum 1004 comprised a PE mesh of about 325 micron thickness, with an average mesh opening of about 335 microns by 367 microns and a cross sectional dimension of about 173 microns (Industrial mesh cloth #60 available from NBC). The mesh layer for spectrum 1006 comprised PET mesh of about 125 micron thickness, with an average mesh opening of about 211 microns and a cross sectional dimension of 71 microns (Industrial mesh cloth T-No. 90S available from NBC). The mesh layer for spectrum 1008 comprised a PET mesh of about 60 micron thickness, with an average mesh opening of about 27 microns and a cross sectional dimension of about 33 microns (Industrial mesh cloth #70 available from NBC). The mesh layer for spectrum 1010 comprised the same PET mesh as for spectrum 702. Each of the multilayer sound absorbing structures was prepared by the same manner to those for the samples of spectra 702, 704 and 706. The backing airspace was 10 mm. All the spectra in FIG. 10 were generated in similar manner to those described with reference to FIG. 5.

Figure 11:
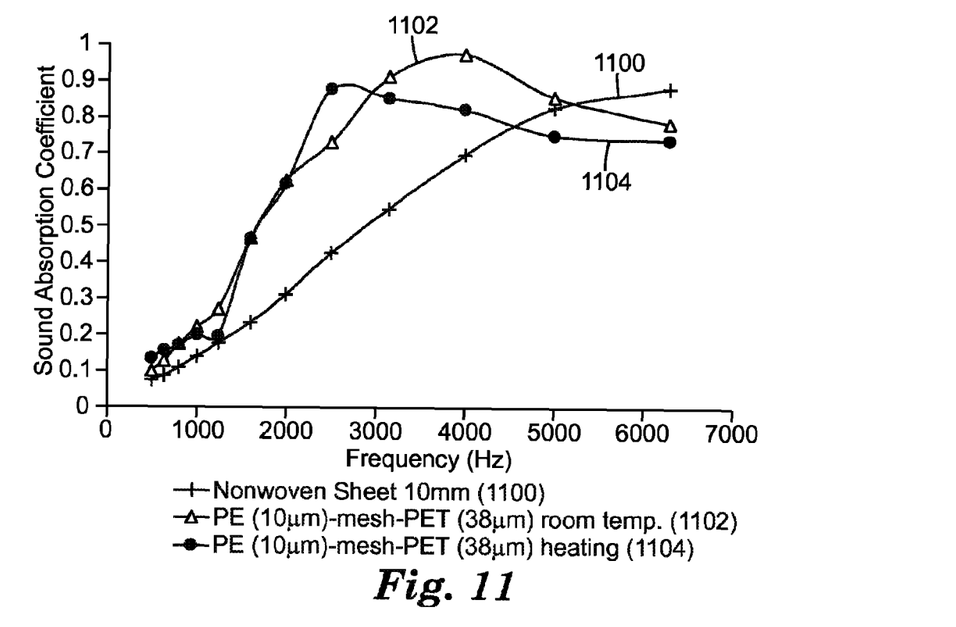
FIG. 11 is a graph of the sound absorption coefficient of multilayer sound absorbing structures assembled by various methods of lamination.

FIG. 11 is a graph of the sound absorption coefficient of multilayer sound absorbing structures with various methods of lamination, in comparison to a nonwoven sheet. Spectrum 1100 depicts the sound absorption coefficient of a non-woven sheet having a thickness of about 10 mm, without a backing airspace. Spectrum 1102 depicts the sound absorption coefficient of the same multilayer sound absorbing structure as the sample for spectrum 710. The multilayer sound absorbing structure for 1102 was prepared by the same manner to those for the samples of spectra 708, 710 and 712. Sample for spectrum 1104 included the same layers as the sample for 1102 and was prepared by the same manner to those for the samples of spectra 702, 704 and 706. The backing airspace was 10 mm. All the spectra in FIG. 11 were generated in similar manner to those described with reference to FIG. 5.

Figure 12:
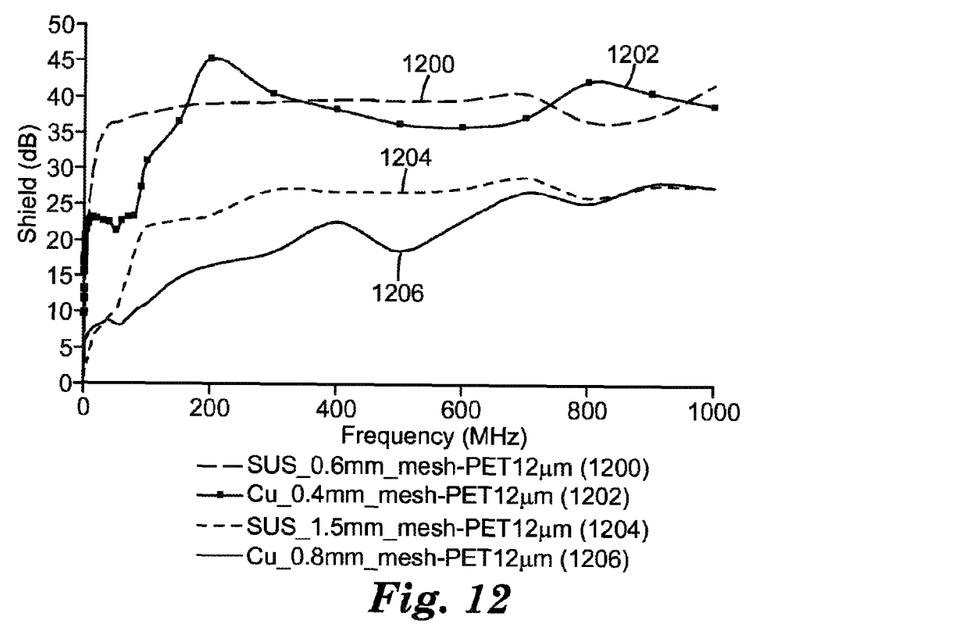
FIG. 12 is a graph illustrating an electromagnetic shielding property of various metal meshes.

FIG. 12 is a graph illustrating an electromagnetic shielding property of various metal meshes. Samples for spectra 1200 and 1204 included a stainless steel mesh comprising SUS304 and the 12 micron thick PET film same as used for the spectrum 502. The stainless steel mesh for 1200 had a mesh opening of about 0.6 mm, a wire cross sectional dimension of about 0.3 mm and a thickness of about 537 microns and the stainless steel mesh for 1204 had a mesh opening of about 1.5 mm, a wire cross sectional dimension of about 0.3 mm and a thickness of about 556 microns. Samples for spectra 1202 and 1206 included a copper mesh and the 12 micron thick PET film same as used for the spectrum 502. The copper mesh for 1202 had a mesh opening of about 0.4 mm, a wire cross sectional dimension of about 0.2 mm and a thickness of about 646 microns and the copper mesh for 1206 had a mesh opening of about 0.8 mm, a wire cross sectional dimension of about 0.3 mm and a thickness of about 560 microns. All the spectra in FIG. 12 were generated in accordance with the KEC method, which is a shielding effectiveness measuring method developed by Kansai Electronic Industry Development Center. Based on electric field distribution in a TEM cell, EMI shielding effectiveness testing equipment has a testing space which symmetrically holds a sample between two opposite surfaces on a plane perpendicular to a signal transmission axis. A transmitting antenna is set in a way to generate an electromagnetic field and the signal level at a receiving antenna is measured. Field intensity attenuation is calculated by comparison of the signal levels at the transmitting and receiving antennas and this attenuation is a measure of shielding effectiveness. The testing space between the outgoing part and the receiving part was 10 mm and a frequency of 0.1 to 1000 MHz was used for the measurement. Generally, it is can be said that an article having 20 dB or more of shielding effect blocks 90% or more of electromagnetic waves.

From the disclosure thus described, it will be obvious that the disclosure may be varied in many ways. Such variations are not to be regarded as a departure from the sprit and scope of the disclosure, and all such modifications as would be obvious to one skilled in the art are intended for inclusion within the scope of the following claims.

The invention claimed is:

1. A multilayer sound absorbing structure comprising: a first microperforated film comprising through-micro bores, a second microperforated film comprising through-micro bores, and a mesh layer sandwiched between the first and second microperforated films.

2. The multilayer sound absorbing structure according to claim 1 wherein the diameter range of the through-micro bores of the first and second microperforated films is 10 microns to 200 microns.

3. The multilayer sound absorbing structure according to claim 1 wherein the first and second microperforated films have a Gurley air permeability of 0.1 seconds per 100 cc to 300 seconds per 100 cc.

4. The multilayer sound absorbing structure according to claim 1 wherein the first and second microperforated films have about 77,500 through-micro bores per square meter to about 6,200,000 through-micro bores per square meter.

5. The multilayer sound absorbing structure according to claim 1 wherein the thickness of at least one of the first microperforated film and the second microperforated film is about 10 microns to about 250 microns.

6. The multilayer sound absorbing structure according to claim 1 wherein the mesh layer comprises mesh openings with an average diameter of about 0.001 mm to about 30 mm.

7. The multilayer sound absorbing structure according to claim 1 wherein the weight of the mesh layer is about 5 grams per square meter to about 1500 grams per square meter.

8. The multilayer sound absorbing structure according to claim 1 wherein the total thickness of the multilayer sound absorbing structure is about 50 microns to 1500 microns.

9. The multilayer sound absorbing structure according to claim 1 wherein the first microperforated film and the second microperforated film respectively comprise a material selected from the group consisting of polyethylene terephthalate (PET), polyethylene (PE), polypropylene (PP), polyvinyl chloride (PVC), and polyvinylidene chloride (PVDC), and combinations thereof, and/or the mesh layer comprises a material selected from the group consisting of polyethylene terephthalate (PET), polyethylene (PE), polypropylene (PP), ethylene-tetrafluoroethylene (ETFE), and combinations thereof.

10. The multilayer sound absorbing structure according to claim 1 further comprising an air gap between the first microperforated film and the second microperforated film.

11. The multilayer sound absorbing structure according to claim 1 wherein the first microperforated film, the mesh layer and the second microperforated film are attached together by adhesive bonding or dry lamination.

12. The multilayer sound absorbing structure according to claim 11 wherein the adhesive is present in discrete locations.

13. A method of absorbing sound comprising the steps of:
providing the multilayer sound absorbing structure of claim 1; and,
positioning the multilayer sound absorbing structure between an acoustic source and a sound-reflecting surface, with a backing airspace between the multilayer sound absorbing structure and the sound-reflecting surface.

14. The method of absorbing sound according to claim 13, wherein the backing airspace between the multilayer sound absorbing structure and the sound-reflecting surface is from about 1 mm to 20 mm in thickness.

15. The method of absorbing sound according to claim 13, wherein the backing airspace between the multilayer sound absorbing structure and the sound-reflecting surface is from about 1 mm to 10 mm in thickness.

16. The method of absorbing sound according to claim 13, wherein the backing airspace between the multilayer sound absorbing structure and the sound-reflecting surface is from about 1 mm to 5 mm in thickness.

17. A sound absorber, comprising:
a sound-reflecting surface; and, the multilayer sound absorbing structure of claim 1 disposed near the sound-reflecting surface with a backing airspace between the multilayer sound absorbing structure and the sound-reflecting surface.

18. The sound absorber of claim 17, wherein the backing airspace between the multilayer sound absorbing structure and the sound-reflecting surface is from about 1 mm to 20 mm in thickness.

19. The sound absorber of claim 17, wherein the backing airspace between the multilayer sound absorbing structure and the sound-reflecting surface is from about 1 mm to 10 mm in thickness.

20. The sound absorber of claim 17, wherein the backing airspace between the multilayer sound absorbing structure and the sound-reflecting surface is from about 1 mm to 5 mm in thickness.

21. The multilayer sound absorbing structure according to claim 1 wherein the through-micro bores of one film are not aligned with the through-micro bores of the other film.

22. A multilayer sound absorbing structure comprising: a first microperforated film comprising through-micro bores, a second microperforated film comprising through-micro bores, and a mesh layer sandwiched between the first and second microperforated films, wherein the diameter range of the through-micro bores of the first and second microperforated films is 10 microns to 200 microns, the first and second microperforated films have a Gurley air permeability of 0.1 seconds per 100 cc to 300 seconds per 100 cc, the first and second microperforated films have about 77,500 through-micro bores per square meter to about 6,200,000 through-micro bores per square meter, the thickness of at least one of the first microperforated film and the second microperforated film is about 10 microns to about 250 microns, the mesh layer comprises mesh openings with an average diameter of about 0.001 mm to about 30 mm, the weight of the mesh layer is about 5 grams per square meter to about 1500 grams per square meter, and the total thickness of the multilayer sound absorbing structure is about 50 microns to 1500 microns.

* * * * *